Patented Oct. 21, 1952

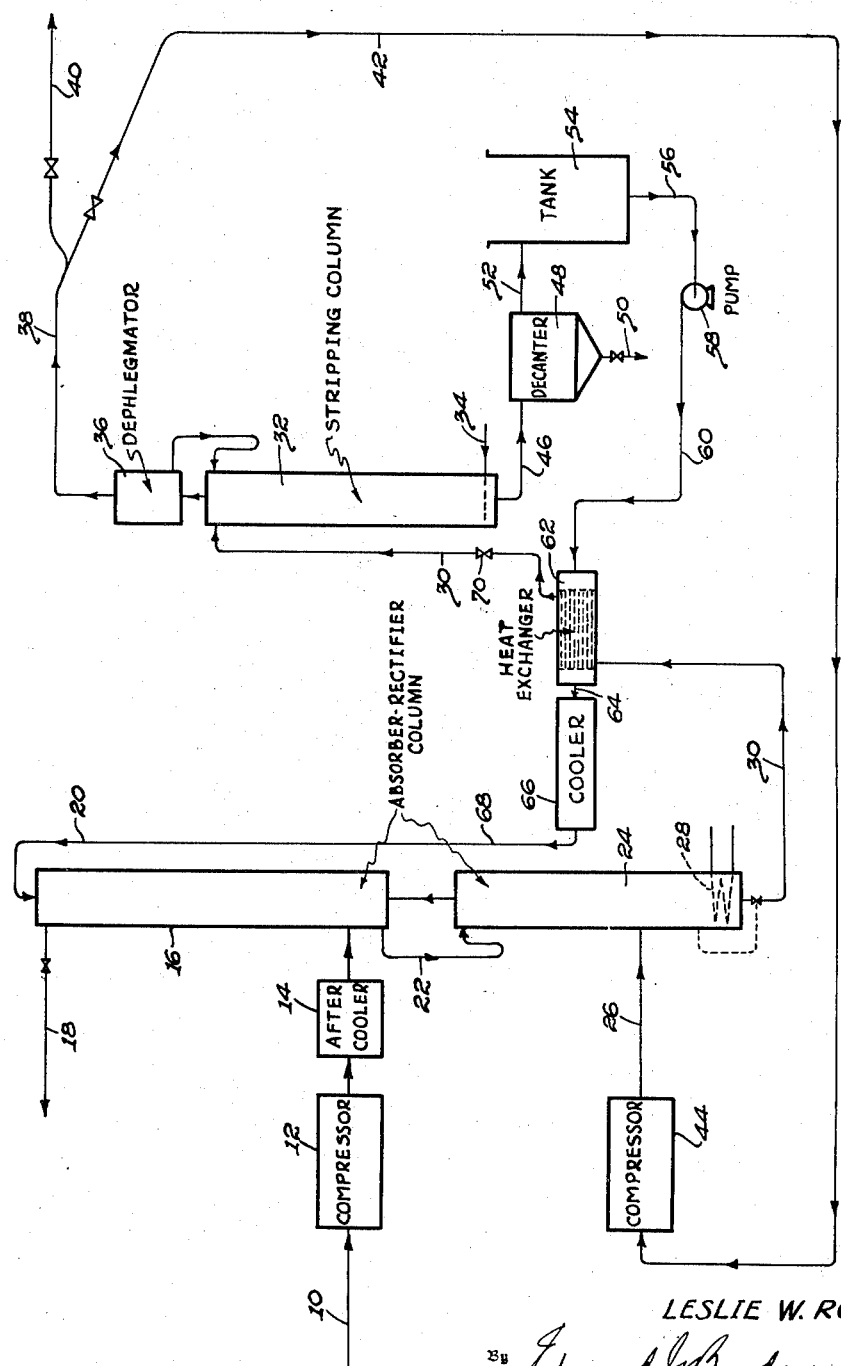

2,614,904

UNITED STATES PATENT OFFICE 2,614,904

GAS SEPARATION

Leslie W. Royer, Aliquippa, Pa., assignor to Koppers Company, Inc., Pittsburgh, Pa., a corporation of Delaware Application December 4, 1946, Serial No. 713,899

1 Claim. (Cl. 23—2)

This invention relates to the separation of hydrogen sulphide from gas mixtures by selective absorption. More particularly the invention relates to the separation of hydrogen sulphide from carbon dioxide by selective absorption in a liquid absorbent such as diethylbenzene, aniline or kerosene.

Practically all fuel gases, such as coke oven gas, water gas, carburetted water gas, and coal gas contain acid constituents such as hydrogen sulphide, carbon dioxide and cyanogen. These acid constituents are generally scrubbed out of the gases with water or an alkaline solution. The principal acid constituents which are removed from a coke oven gas when using an alkali carbonate absorbent solution after the constituents are stripped from the absorbent, consist of a gas mixture of about 80% $H_2S$ and 20% $CO_2$. Such a gas is an important source of raw material wherein the $H_2S$ is used in the manufacture of chemical compounds. It is necessary, however, to separate the carbon dioxide from the hydrogen sulphide before the $H_2S$ can be used for making many compounds.

I have found that the differences in solubility of $H_2S$ and $CO_2$ in some special solvents is such that a substantially pure hydrogen sulphide may be recovered by absorption.

The primary object of the present invention is to provide a method of separating $H_2S$ from a gaseous mixture of $H_2S$ and $CO_2$ by liquid absorption.

Another object of the invention is to provide a method of separating pure $H_2S$ from $CO_2$ in a gaseous state with a very high percentage of recovery of $H_2S$.

A further object of the invention is to provide a method of continuously separating $H_2S$ in a pure state from gaseous $CO_2$.

A still further object is to provide a method of separating pure $H_2S$ from $CO_2$ in the gaseous state with an aniline absorbent.

With these and other objects in view, the invention consists in the method of separating $H_2S$ from $CO_2$ in a gaseous state by selective liquid absorption as hereinafter described and particularly defined in the claim.

The various features of the invention are illustrated in the accompanying drawing which is a diagrammatic flow sheet of an apparatus in which the preferred method of separating hydrogen sulphide from carbon dioxide may be carried out.

It is well known that both carbon dioxide and hydrogen sulphide will dissolve in solvents. In order to use a solvent or absorbent method of separating $CO_2$ from $H_2S$ it is necessary to find an absorbent which is stable and selective. Furthermore, it is important that the separation of $CO_2$ from $H_2S$ should be complete and that the purity of the $H_2S$ shall be very high.

Many solvents have been tested and among the solvents tested which gave promise of providing an absorbent for separating $CO_2$ from $H_2S$ are those solvents which are shown in the table below.

Table.—Solubilities of $H_2S$ and $CO_2$ in solvents

| Solvent | Vol. Gas at 0° C. 760 mm. / Vol. Solvent at 26° C. | | Vol. $H_2S$ / Vol. $CO_2$ Solubility Ratio |
|---|---|---|---|
| | $H_2S$ | $CO_2$ | |
| Equilibrium at 30° C. and 10 lbs. Gage Pressure: | | | |
| Tap water | 2.70 | 1.24 | 2.2 |
| Salt water | 1.42 | 0.52 | 2.7 |
| Kerosene | 7.92 | 1.58 | 5.0 |
| Benzene | 15.0 | 3.46 | 4.3 |
| Cottonseed Oil | 9.74 | 2.27 | 4.3 |
| #30 Lube Oil | 4.62 | 0.75 | 6.2 |
| Ethylene Glycol | 7.90 | 2.03 | 3.9 |
| Tetralin | 10.0 | 1.96 | 5.1 |
| Toluene | 12.8 | 3.16 | 4.0 |
| Turpentine | 8.54 | 2.43 | 3.5 |
| Alphamethylnaphthalene | 13.3 | 2.07 | 6.3 |
| N. Butanol | 12.38 | 2.89 | 4.3 |
| Aniline | 22.8 | 1.94 | 11.8 |
| Diethylbenzene | 13.6 | 2.8 | 4.9 |

Typical examples of suitable absorbents are aniline, diethylbenzene and kerosene. When a mixture of $CO_2$ and $H_2S$ with a major portion of $H_2S$ is passed into any one of the preferred absorbent solutions, all of the gas is absorbed. The $H_2S$ is many times more soluble in the preferred solvent than the $CO_2$ and therefore as the volume of gas increases, the $H_2S$ acts to replace the $CO_2$ and therefore the $CO_2$ will be set free from the absorbent solution as an exhaust gas. A continued absorption of $H_2S$ and $CO_2$ in the preferred absorbent will act to saturate the absorbent with $H_2S$ at which time the $CO_2$ should all be driven out of the absorbent if the absorbent has the proper degree of selectivity. It has been found that aniline has a very high degree of selectivity and diethylbenzene and kerosene will all produce a hydrogen sulphide which has a 99.0+ purity. Furthermore these solvents are capable of recovering more than 98% of the $H_2S$ available in the acid gas mixture.

In carrying out the process, sufficient $H_2S$ should be passed through the absorbent with the $CO_2$ so that the absorbent becomes saturated with $H_2S$ and a small amount of $H_2S$ above the saturated condition of the absorbent will pass out with the $CO_2$ as exhaust gas.

I have found that carbon dioxide may be separated from hydrogen sulphide by a continuous process in which absorbent liquid passes downwardly through a tower in countercurrent to a stream of gas mixture passing upwardly through the tower. Due to the countercurrent circulation of the absorbent and gas, it is preferred to introduce the gas mixture into the mid portion of the absorbing tower and to pass pure $H_2S$ gas into the bottom of the tower in order to remove or scrub out of the saturated absorbent any $CO_2$ that may be entrained therein. By this means an $H_2S$ saturated $CO_2$ free absorbent may be obtained which when distilled will give a hydrogen sulphide of a high degree of purity.

Preferably the absorption of $H_2S$ should be carried out under pressure because pressure operation permits the use of a very much smaller volume of absorbent. Further, when the absorbent is saturated with $H_2S$ under a substantial pressure, the major portion of the $H_2S$ may be separated from the absorbent by merely releasing the pressure on the saturated absorbent. If, for example, the $H_2S$ is absorbed under five atmospheres of pressure, then when the pressure is released on the saturated absorbent to reduce it to atmospheric pressure, four-fifths of the $H_2S$ will be separated from the absorbent. If it is not important to maintain a high efficiency recovery of the $H_2S$, then the absorbent having $H_2S$ therein may be reused in the operation. The partially separated absorbent will thereby have part of its capacity to absorb cut off. It is desirable that the saturated solution after the pressure has been relieved, should be distilled with heat in order to remove all of the $H_2S$. By pressure absorption a comparatively small amount of absorbent may be used for removing a large volume of $H_2S$ from a gaseous mixture.

Referring to the drawings the preferred method of the invention may be carried out as follows:

A mixture of $H_2S$ and $CO_2$ is introduced through a line 10 into a compressor 12 and compressed preferably to about five atmospheres. This compressed gas passes through a cooler 14 into the bottom of an absorption tower 16. The $CO_2$ and $H_2S$ will be absorbed in the absorbent in the tower and then the $CO_2$ will be displaced by the $H_2S$, the $CO_2$ exhausting through an outlet 18. The absorbent is introduced into the top of the tower through a line 20. In view of the fact that the gaseous mixture of $CO_2$ and $H_2S$ is introduced at the bottom of the tower 16, some $CO_2$ will remain in the absorbent solution passing out of the tower 16 through a line 22. This absorbent liquid enters the top of a rectifying absorber 24 and passes downwardly therein in countercurrent contact with $H_2S$ which is introduced near the bottom of the absorber through a line 26. If desired, the saturated solution of absorbent in the bottom of the tower may be heated by a steam coil 28 to insure that all $CO_2$ is driven out of the absorber. It is not necessary to use both recycle $H_2S$ and steam to remove last traces of $CO_2$. Either will suffice. The saturated solution of absorbent leaves the bottom of the tower 24 through a line 30 and passes into the top of a stripping column 32. Into the bottom of the stripping column 32 is introduced a stream of direct steam through a line 34. The direct contact of open steam with the absorbent heats the absorbent liquid which assists in driving out the $H_2S$ and the steam by its partial pressure assists in removing $H_2S$ from the absorber. The mixture of steam and $H_2S$ passes through a dephlegmator 36 wherein water is separated from the $H_2S$ gas and the $H_2S$ gas leaves the dephlegmator through a line 38.

The gas passing out through the line 38 is pure $H_2S$ and this stream is divided, one part passing through a line 40 to a place of storage and the other part passing through a line 42 back to a compressor 44. The stream of pure $H_2S$ reaching the compressor is compressed to a pressure slightly higher than the pressure in the tower 24 and is then introduced into the tower through the line 26.

The absorbent passing through the stripping column flows through a line 46 into a separator 48 and condensed steam is withdrawn from the bottom of the separator through a line 50. The absorbent liquid passes through a line 52 into a collecting tank 54. From the tank 54 the absorbent passes through a line 56 and is forced by means of a pump 58 through a line 60 into a heat interchanger 62. The hot absorbent may be cooled in heat interchanger 62 by means of the cooled absorbent leaving the bottom of the tower 24 and flowing through the line 30. In the interchanger and cooler the lean absorbent will be cooled to 50° to 100° F. depending upon the temperatures of the liquids and will then be passed through a line 68 up to the line 20 by which it is introduced into the top of the absorber 16. It is desirable to introduce the absorbent into the top of the tower 16 at a comparatively low temperature (50° to 100° F.) to maintain an efficient absorption of the acid gases.

If the absorption towers and stripping column have sufficient capacity for handling the desired amount of gas and absorption solution, the compressors 12 and 44 may be omitted and the gas can be circulated through the towers at substantially atmospheric pressure. When pressure is used in the absorption, reducing valve 70 is used in the line 30 to reduce the pressure on the absorbent down to substantially atmospheric pressure before introducing the absorbent into the stripping column 32. This pressure reduction acts to strip out the $H_2S$ from the absorbent and assist the heat and steam in carrying out the stripping distillation operation.

In the drawing the absorption and rectifying columns are shown as separate towers but it is apparent that one tower might be used in which the absorbent passes from the top to the bottom when the raw gas mixture being introduced into the mid portion for absorption operation and the pure $H_2S$ being introduced near the bottom of the tower for stripping out $CO_2$ entrained in the absorbent.

In carrying out the operation the amount of cool absorbent introduced into the top of the tower 16 should be such that practically all of the $H_2S$ will be absorbed and the absorbent will be saturated with $H_2S$ adjacent the outlet of the exhaust gas. In order to maintain a saturated condition of the absorbent, a small amount of $H_2S$ will always pass out of the exhaust line 18 with the $CO_2$. It is desirable to circulate the minimum amount of absorbent in carrying on the operation. Therefore the volumes of gas and absorbent solution should be carefully measured to carry out an efficient absorption.

As an example of the separation method, when using 60 lbs. pressure, a gas mixture of $H_2S$ and $CO_2$ composed of 22.3 mols of $H_2S$ and 5.6 mols of $CO_2$ per hour, or about 10,500 cu. ft. is passed through an absorption tower into which is introduced 5400 gallons per hour of diethylbenzene. From the stripping column substantially 22.3 mols per hour of pure $H_2S$ is removed through the line 40 while 27.9 mols or 10,500 cu. ft. of $H_2S$ is circulated through the line 42 back to the compressor 14. If substantially the same volume of gas per hour is treated in the apparatus at atmospheric pressure, then 23,800 gallons per hour of diethylbenzene must be circulated down through the tower 16. From the dephlegmator of the stripping column 22.3 mols of pure $H_2S$ is removed through the line 40 and 40.2 mols of pure $H_2S$ or 15,300 cu. ft. of $H_2S$ is circulated through the line 42 back to the rectifying column 24. 1780 lbs. of open steam is used in rectifying the saturated absorbent in the stripping column for the pressure absorption operation whereas 1975 lbs. of open steam is required for stripping $H_2S$ out of the stripping column when the absorption is carried out at atmospheric pressure. The operation outlined in the example given above provides a large excess of $H_2S$ for removing the $CO_2$ from the saturated absorbent. It has been found in most cases that from 20% to 80% of the amount of $H_2S$ that was removed from the line 40 is sufficient for removing all $CO_2$ from the saturated absorbent. By circulating less $H_2S$ back to the rectifying column the apparatus will have a higher absorption capacity. The quantity of recycled $H_2S$ will depend on the desired purity of the $H_2S$ product and should be kept as low as possible.

The preferred form of the invention having been thus described, what is claimed as new is:

A method for separating $H_2S$ of over 98 percent purity from a gaseous mixture of $H_2S$ and $CO_2$ which comprises flowing said gaseous mixture upwardly in an absorption zone in multistage contact with a liquid selective absorbent selected from the group consisting of kerosene and aniline, controlling the relative volumes of liquid absorbent and gaseous mixture to absorb substantially all of the $H_2S$ from the gaseous mixture by the time it reaches the top of the absorption zone, contacting liquid absorbent from the absorption zone in a second multistage contact zone with substantially pure $H_2S$ and thereby displacing $CO_2$ from said liquid absorbent and saturating it with $H_2S$, and stripping $H_2S$ from the saturated liquid absorbent in a stripping zone.

LESLIE W. ROYER.

REFERENCES CITED

The following references are of record in the file of this patent:

UNITED STATES PATENTS

| Number | Name | Date |
| --- | --- | --- |
| 1,422,183 | Curme, Jr. | July 11, 1922 |
| 1,725,925 | Kent | Aug. 27, 1929 |
| 2,083,213 | Baehr et al. | June 8, 1937 |
| 2,144,692 | Schuftan | Jan. 24, 1939 |
| 2,161,663 | Baehr et al. | June 6, 1939 |
| 2,169,210 | Balcar | Aug. 15, 1939 |
| 2,180,386 | Balcar | Nov. 21, 1939 |
| 2,264,878 | Hatch | Dec. 2, 1941 |

OTHER REFERENCES

Seidell: "Solubilities of Inorganic and Organic Compounds," pp. 232 and 322, vol. I, 1919, Van Nostrand Inc., N. Y.